(12) United States Patent
Paoli

(10) Patent No.: US 8,193,652 B2
(45) Date of Patent: Jun. 5, 2012

(54) REVERSIBLE HYDROELECTRIC DEVICE

(76) Inventor: Joseph Paoli, Bastia (FR)

( * ) Notice: Subject to any disclaimer, the term of this patent is extended or adjusted under 35 U.S.C. 154(b) by 328 days.

(21) Appl. No.: 12/513,292

(22) PCT Filed: Nov. 6, 2007

(86) PCT No.: PCT/FR2007/052305
§ 371 (c)(1),
(2), (4) Date: Feb. 8, 2010

(87) PCT Pub. No.: WO2008/056083
PCT Pub. Date: May 15, 2008

(65) Prior Publication Data
US 2010/0140935 A1    Jun. 10, 2010

(30) Foreign Application Priority Data
Nov. 10, 2006   (FR) .................................... 06 09818

(51) Int. Cl.
*F04D 13/06* (2006.01)
(52) U.S. Cl. .......................................... 290/43; 290/54
(58) Field of Classification Search .................. 290/54, 290/43
See application file for complete search history.

(56) References Cited

U.S. PATENT DOCUMENTS

| | | | |
|---|---|---|---|
| 2,246,472 A * | 6/1941 | Brunswick | 290/52 |
| 2,962,599 A | 11/1960 | Pirkey | |
| 3,614,268 A | 10/1971 | Merenda | |
| 4,272,686 A * | 6/1981 | Suzuki | 290/54 |
| 4,275,989 A | 6/1981 | Gutierrez Atencio | |
| RE31,023 E * | 9/1982 | Hall, III | 405/37 |
| 4,496,845 A * | 1/1985 | Ensign et al. | 290/43 |
| 7,656,050 B2 * | 2/2010 | Riley | 290/43 |
| 7,802,942 B2 * | 9/2010 | Cripps | 405/75 |
| 7,866,919 B2 * | 1/2011 | Miller | 405/80 |

FOREIGN PATENT DOCUMENTS

| | | | |
|---|---|---|---|
| FR | 2908481 A1 * | 5/2008 | |
| JP | 57210170 A * | 12/1982 | |
| JP | 07184400 A * | 7/1995 | |
| JP | 2000184794 A * | 6/2000 | |

* cited by examiner

*Primary Examiner* — Joseph Waks
(74) *Attorney, Agent, or Firm* — Meyertons, Hood, Kivlin, Kowert & Goetzel, P.C.; Eric B. Meyertons

(57) ABSTRACT

Reversible hydroelectric device that can be installed on an outside pipe, comprising a hydraulic power unit comprising a hydraulic machine comprising a centrifugal pump that can be reversed as a turbine and a hydraulic circuit having bypass branches and motorized valves allowing circulation of water in said hydraulic machine in one direction or the other irrespective of the direction of circulation of the water in said outside pipe; an electric machine coupled to said hydraulic machine and comprising an asynchronous motor that can be reversed as an asynchronous generator; and an electronic system comprising a programmable controller for adjusting and/or regulating said valves and an electronic variator for adjusting and/or regulating the rotation speed of said electric machine so that the pressure and/or flow rate downstream of the hydraulic machine depending on the direction of circulation is/are stabilized or adjusted to at least one set point value.

10 Claims, 7 Drawing Sheets

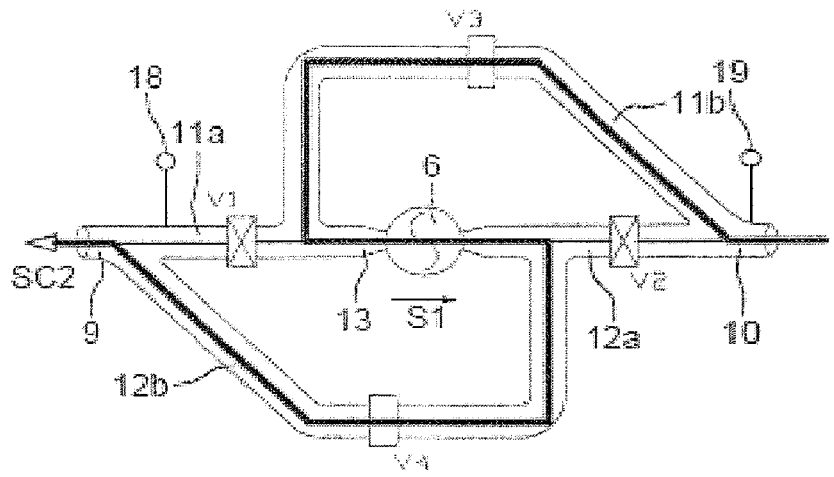
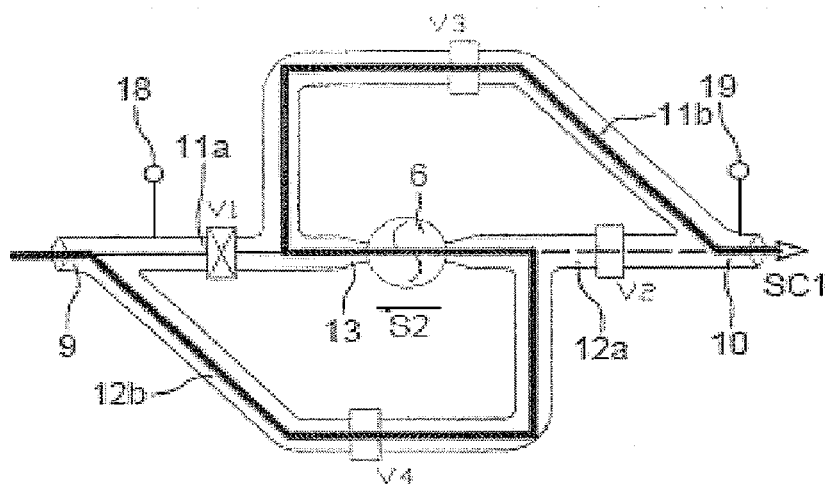

FIG.9

| Direction of water | DESIGNATION | | VALVES | | | | |
|---|---|---|---|---|---|---|---|
| | Type of operation | V1 | V2 | V3 | V4 | |
| SC1 | by pass | open | closed | open | closed | L1 |
| | as pump | open | open | closed | closed | L2 |
| | as turbine | closed | Adjusted intermediate position | open | open | L3 |
| SC2 | by pass | open | closed | open | closed | L4 |
| | as pump | closed | closed | open | open | L5 |
| | as turbine | open | open | Adjusted intermediate position | closed | L6 |

REVERSIBLE HYDROELECTRIC DEVICE

BACKGROUND OF THE INVENTION

1. Field of the Invention

The present invention relates to the field of hydroelectric installations.

2. Description of the Relevant Art

For a long time, hydroelectric installations have been known which, on the one hand, form units for the production of electric energy under the effect of water chutes and, on the other hand, form units for pumping water under the effect of electric motors.

Furthermore, mixed hydroelectric installations are proposed in U.S. Pat. No. 2,962,599 and U.S. Pat. No. 3,614,268 discussed below.

U.S. Pat. No. 2,962,599 describes a hydraulic installation making it possible to run water from a high reservoir to a low reservoir and vice versa. This installation includes a main pipe which has two portions one of which is connected to the high reservoir and the other is connected to the low reservoir and between which are provided, via two branching deflectors, two ducts mounted in parallel and connected to one another via a secondary duct. On this secondary duct is installed a hydraulic member connected rotatably to an electric member.

In a first closed position of the deflectors, the water can travel from the high reservoir to the low reservoir while passing through the hydraulic member in one direction, this hydraulic member forming a turbine for driving the electric member which forms an electric generator. This first position of the deflectors is adopted when there are needs for electric energy on an electricity power supply, for example during a period of high demand from the users.

In a second closed position of the deflectors, the water can travel from the low reservoir to the high reservoir while passing through the hydraulic member in the same direction as before, this hydraulic member then forming a pump actuated by the electric member which then forms an electric motor. This second position of the deflectors is adopted when the main electricity supply can be a supplier of electric energy, for example in a period of low demand from the users.

When the deflectors are in the open position, the water travels directly from the high reservoir to the low reservoir through parallel ducts, without passing through the hydraulic member. This open position of the deflectors may be adopted for reasons of spillage.

U.S. Pat. No. 3,614,268 describes a hydraulic installation which includes, installed on a single pipe for direct connection from a high reservoir to a low reservoir, a hydraulic member connected to an electric member. In the direction of circulation of the water from the high reservoir to the low reservoir, the hydraulic member forms a turbine for driving the synchronous electric member which forms a synchronous generator. In the other direction of circulation of the water from the low reservoir to the high reservoir, the hydraulic member forms a pump driven by the electric member which forms a synchronous motor. An electric circuit makes it possible to maintain a constant rotation speed of the common shaft of the hydraulic member and of the electric member, in turbine mode acting on a valve and in pump mode acting on the frequency of an inverter.

SUMMARY OF THE INVENTION

It is desirable to provide a hydroelectric device capable of being installed on a pipe, for example of a hydraulic network of untreated or drinking water, in which the water may be made to circulate in one direction or in the other in this pipe, depending, in particular, on imperatives associated with the hydraulic network.

It is further desirable to provide a hydroelectric device capable of adapting, and consequently of varying, maintaining, reducing, or in contrast increasing, the conditions of pressure and/or flow rate in a water-circulation pipe in one direction or in the other direction in a hydraulic network in order to optimize the operation of this hydraulic network.

It is also desirable to provide a hydroelectric device capable of consuming electric energy or of producing it, depending in particular on imperatives associated with a hydraulic network.

The reversible hydroelectric device according to an embodiment, being able to be installed on an outside pipe, may include: a hydraulic power unit including a hydraulic machine consisting of a centrifugal pump that can be reversed as a turbine and a hydraulic circuit having a branching and/or connecting ducts and motorized valves allowing water circulation in said hydraulic machine in one direction or the other irrespective of the direction of circulation of the water in said outside pipe; an electric machine coupled to said hydraulic machine and consisting of an asynchronous motor that can be reversed as an asynchronous generator; and an electronic system including a programmable controller for adjusting and/or regulating said valves and an electronic variator for adjusting and/or regulating the rotation speed of said electric machine so that the pressure and/or the flow rate downstream of the hydraulic machine according to the direction of circulation is/are stabilized or adjusted to at least one set point value.

According to an embodiment, said hydraulic circuit may be symmetric relative to the hydraulic machine.

According to an embodiment, the body of said hydraulic machine may include symmetrical ducts.

According to an embodiment, the electronic system may include a four-quadrant electronic variator mounted between a main electricity supply and said electric machine and providing, in operation as an asynchronous motor, the adjustment and/or regulation of the rotation speed of said electric machine and, in operation as an asynchronous generator, an electrical adaptation to the main electricity supply.

According to an embodiment, the electronic variator may include two parallel lines including respectively a rectifier and an inverter, mounted head-to-toe in these lines, and a switch designed to connect the electric machine and the main electricity supply by either one of said lines or by the other.

According to an embodiment, the electronic system may include pressure and/or flow rate sensors placed on either side of the hydraulic machine and connected to said programmable controller.

According to an embodiment, the electronic system may include sensors sensing the direction and/or rotation speed and/or torque of the hydraulic machine connected to said programmable controller.

According to an embodiment, the electronic system may include sensors sensing the voltage and/or current and/or frequency and/or thermal properties of the electric machine.

According to an embodiment, the hydraulic circuit may include two branching ducts in parallel inserted between two portions of said outside pipe and at least one connecting duct, the ends of which are connected to said branching ducts, and said hydraulic machine may be installed on this connecting duct and four motorized valves installed respectively on the branches of said branching ducts formed on either side of the ends of said connecting duct.

According to an embodiment, several connecting ducts in parallel on which are respectively installed hydraulic machines connected to electric machines may be provided.

According to an embodiment, several hydraulic machines in series on the connecting duct may be provided, these hydraulic machines being connected to several electric machines or to an electric machine via a transmission.

BRIEF DESCRIPTION OF THE DRAWINGS

The present invention, in its various aspects, will be better understood on studying a hydroelectric device and its operating modes, described as non-limiting examples and illustrated by the drawing in which:

FIGS. 3 to 8 illustrate various modes of water circulation according to embodiments of said hydraulic power unit;

FIG. 9 illustrates a table summarizing the operating modes of the valves of said hydraulic power unit.

Figure 1:
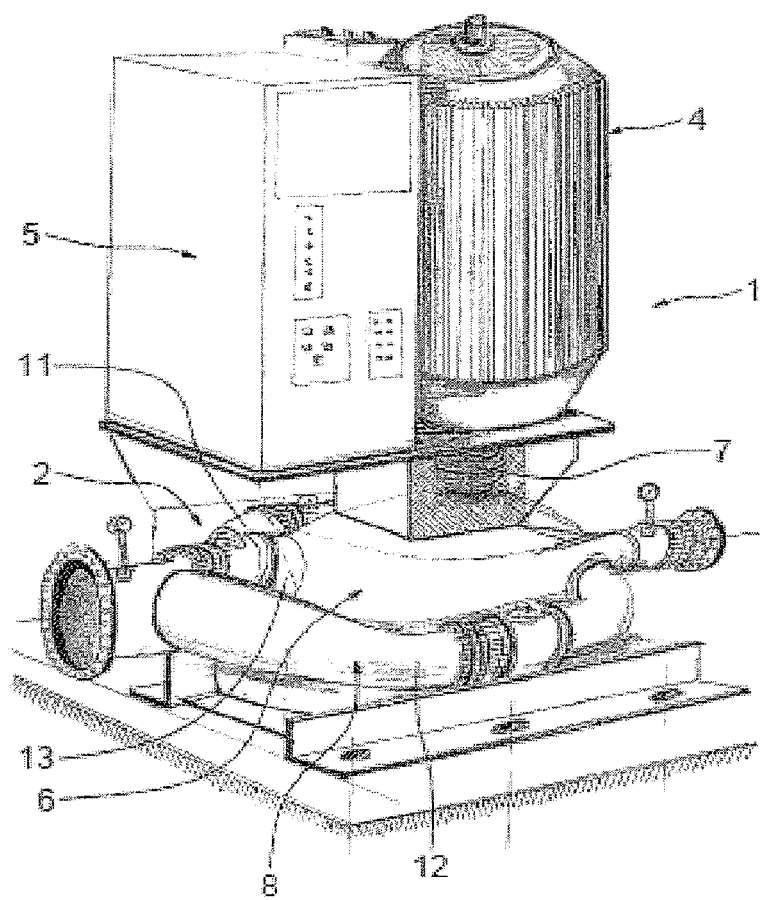
FIG. 1 illustrates a perspective external view of the device according to an embodiment.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
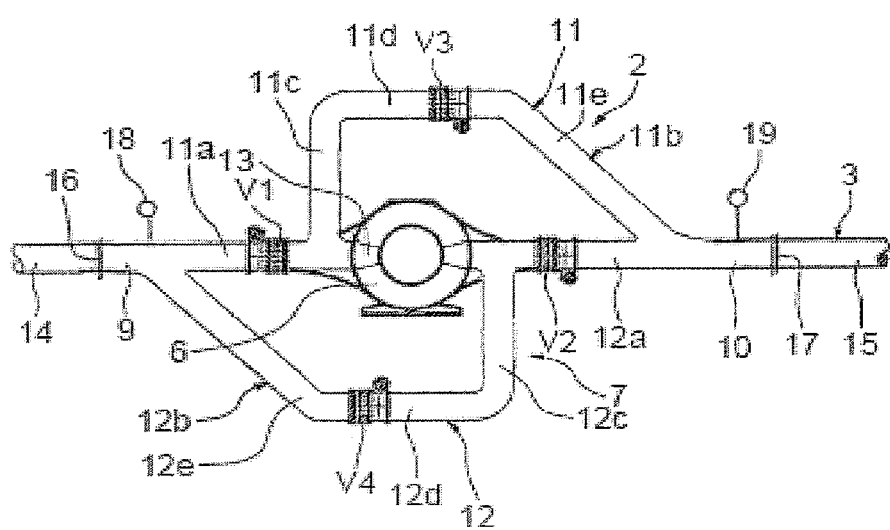
FIG. 2 illustrates a diagram of a hydraulic power unit according to an embodiment.

With reference to FIGS. 1 and 2, it can be seen that a hydroelectric device 1 includes a hydraulic power unit 2 installed on a pipe 3, outside the device, of a hydraulic network, an electric machine 4 and an electronic system 5.

The hydraulic power unit 2 includes a hydraulic machine 6 connected to the electric machine 4 via a shaft 7 and a hydraulic circuit 8.

This hydraulic circuit 8 includes, between two opposite end ducts 9 and 10, two branching ducts 11 and 12 mounted in parallel and a connecting duct 13, the ends of which are connected to said branching ducts and on which the hydraulic machine 6 is installed.

The ends of the opposite ducts 9 and 10 are connected to two opposite portions 14 and 15 of an outside pipe 3 by means of flanges 16 and 17.

The hydraulic power unit 2 also includes four motorized valves V1, V2, V3 and V4, installed respectively on the branches of the branching ducts 11 and 12 formed on either side of the ends of the connecting duct 13.

According to the arrangement shown in the figures, the portions 14 and 15 of the outside pipe 3 are in line; the opposite end ducts 9 and 10, the portions 11a and 12a of the branching ducts 11 and 12, adjacent to the opposite end ducts 9 and 10 and furnished with valves V1 and V2, and the connecting duct 13 are aligned with the portions 14 and 15 of the outside pipe 3; while the other portions 11b and 12b of the branching ducts 11 and 12, furnished with motorized valves V3 and V4, extend while forming U-shapes.

The hydraulic power unit 2 is also furnished, at its ends, with pressure sensors 18 and 19 installed on the opposite end ducts 9 and 10, delivering signals corresponding to pressures P18 and P19.

Advantageously, the hydraulic machine 6 may consist of a centrifugal pump that can be reversed as a turbine and the electric machine 4 may consist of an asynchronous motor that can be reversed as an asynchronous generator.

With reference to FIGS. 3 to 8, various modes of the device 1 will now be described according to the various states of the motorized valves V1, V2, V3 and V4.

In all the figures, it will be considered that the portion 14 of the outside pipe coupled to the end duct 9 is on the left and that the portion 15 of the outside pipe coupled to the end duct 10 is on the right.

It will also be considered that, when the water circulates from left to right in the connecting duct 13, in a direction referenced S1, the hydraulic machine acts as a pump, driven by the electric machine 4 acting as an electric motor, while, when the water circulates from right to left in the connecting duct 13, in the other direction referenced S2, the hydraulic machine acts as a turbine, driving the electric machine 4 acting as an electric generator.

It will also be considered that, when the water circulates in the outside pipe 3 from left to right, the water circulates in a direction referenced SC1, such that it travels from the portion 14 of this pipe to its portion 15 and that, when the water circulates in the outside pipe 3 from right to left, the water circulates in a direction referenced SC2 such that it travels from the portion 15 of this pipe to its portion 14.

Situation I.

Figure 3:
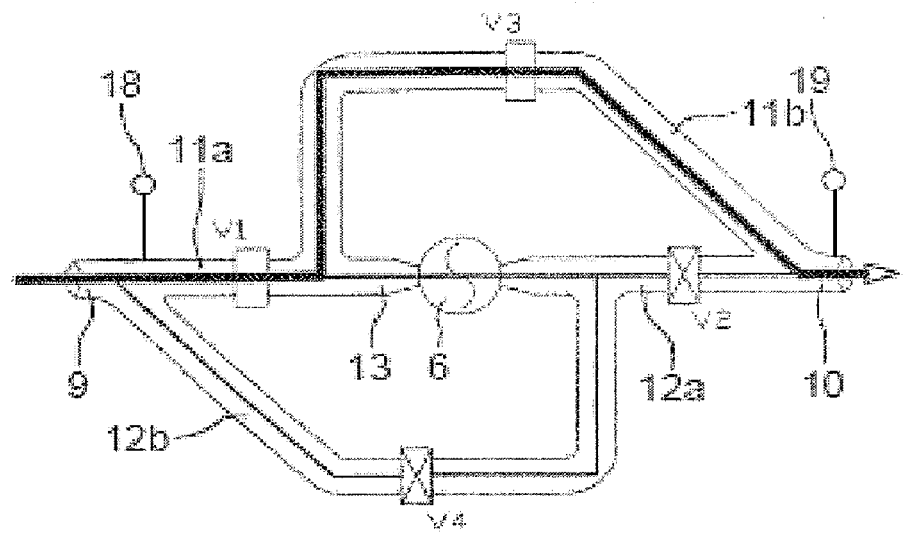
Figure 4:
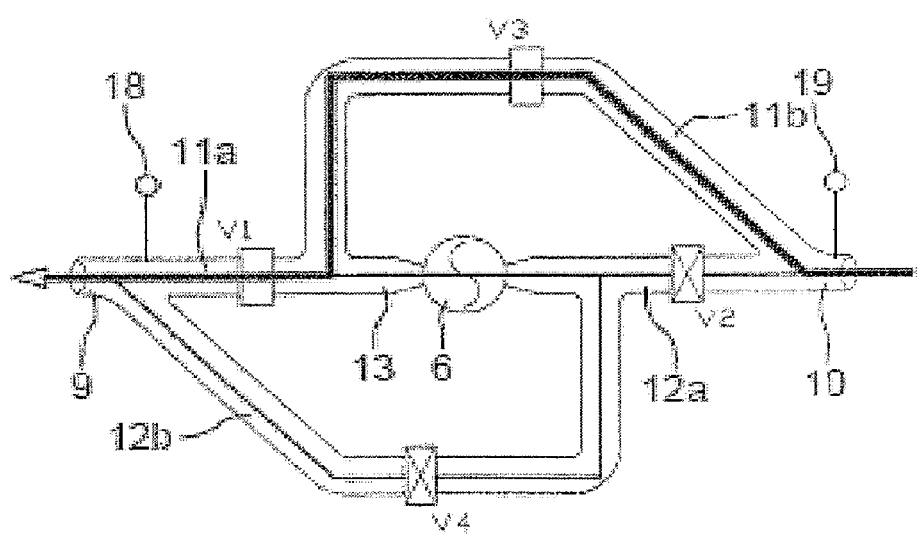

As shown in FIGS. 3 and 4, when the valves V1 and V3 are open and the valves V2 and V4 are closed, the water, being able to circulate in one direction or the other in the outside pipe 3, travels through the hydraulic circuit 8, in one direction or the other, while passing through the branching duct 11, the branching duct 12 being closed. Therefore, the water cannot travel through the connecting duct 13 and therefore does not pass through the hydraulic machine 6.

Associated with this circulation mode is a mode of operation as a bypass such that the hydraulic machine 6 and consequently the electric machine 4 do not rotate. The pressures P18 and P19 detected by the sensors 18 and 19 are approximately equal.

The above embodiment is illustrated as line L1 for the direction SC1 and as line L4 for the direction SC2 of the table in FIG. 9.

An equivalent operating mode is also achieved when, in a symmetrical manner, the valves V1 and V3 are closed and the valves V2 and V4 are open and consequently the water then passes through the duct 12.

Situation II.

Figure 5:
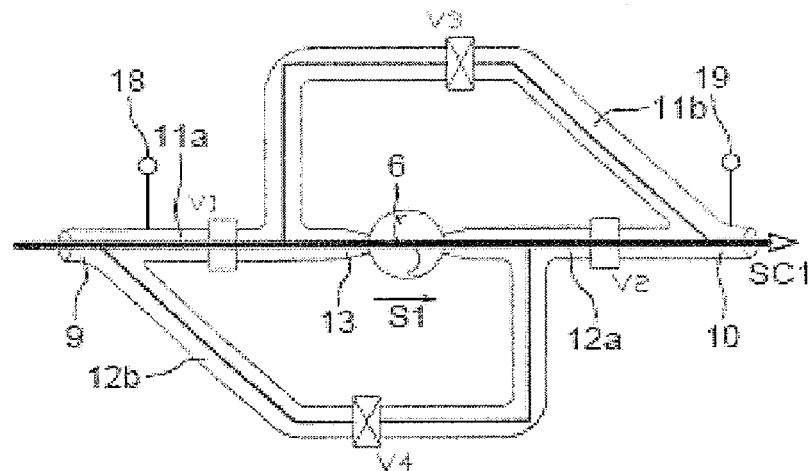
Figure 6:
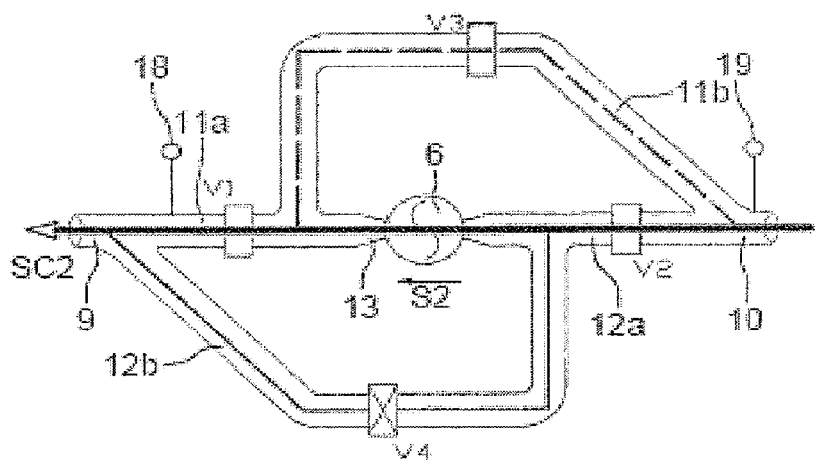

According to the embodiments shown in FIGS. 5 and 6, when the valves V1 and V2 are open and the valves V3 and V4 are closed, the water, being able to circulate in one direction or in the other in the outside pipe 3, circulates through the hydraulic circuit 8, in one direction or in the other, while entering the portion 11a of the branching duct 11, the portion 12a of the branching duct 12 and the connecting duct 13 traveling through the hydraulic machine 6, the water not circulating in the portions 11b and 12b of the branching ducts 11 and 12.

In the embodiment shown in FIG. 5, the water circulates in the outside pipe 3 in the direction SC1 and in the hydraulic machine 6 in the direction S1. Consequently, the hydraulic machine 6 acts as a pump, driven by the electric machine 4 acting as an electric motor. This embodiment is illustrated as line L2 of the table in FIG. 9.

In the embodiment illustrated by FIG. 6, the water circulates in the outside pipe 3 in the direction SC2 and in the hydraulic machine 6 in the direction S2. Consequently, the hydraulic machine 6 acts as a turbine driving the electric machine 4 which acts as an electric generator. This embodiment is illustrated as line 6 of the table in FIG. 9.

In the above two embodiments, the pressure P19 delivered by the sensor 19 is higher than the pressure P18 delivered by the sensor 18.

Situation III.

As shown in FIGS. 7 and 8, when the valves V1 and V2 are closed and the valves V3 and V4 are open, the water, being able to circulate in one direction or in the other in the outside pipe 3, circulates through the hydraulic circuit 8, in one direction or in the other, while entering the portion 11b of the branching duct 11, the portion 12b of the branching duct 12 and the connecting duct 13 while passing through the hydraulic machine 6, the water not circulating in the portions 11a and 12a of the branching ducts 11 and 12.

In the embodiment shown in FIG. 7, the water circulates in the outside pipe 3 in the direction SC2 and in the hydraulic machine 6 in the direction 51. Consequently, the hydraulic machine 6 acts as a pump, driven by the electric machine 4 acting as an electric motor. This embodiment is illustrated as line L5 of the table in FIG. 9.

In the embodiment illustrated by FIG. 8, the water circulates in the outside pipe 3 in the direction SC1 and in the hydraulic machine 6 in the reverse direction S2. Consequently, the hydraulic machine 6 acts as a turbine driving the electric machine 4 which acts as an electric generator. This embodiment is illustrated as line L3 of the table in FIG. 9.

In both of the above embodiments, the pressure P18 delivered by the sensor 18 is higher than the pressure P19 delivered by the sensor 19.

In the embodiments illustrated by FIGS. 6 and 8, in which the hydraulic machine 6 acts as a turbine, it may be advantageous for the valves V3 or V2 not to be completely closed but to be at regulated openings in order to cause a certain quantity of bypass water to pass.

The various operating modes described above, associated with the various states of the valves V1, V2, V3 and V4, may be the consequence of imperatives of a hydraulic network including the outside pipe 3, imperatives associated with the desired direction of circulation in this pipe and of desired conditions concerning the pressures in one or both of the portions 14 and 15 of this pipe, namely concerning the pressure P18, the pressure P19, or both.

As a result of the foregoing, the device 1 is designed to harmoniously combine the flow-rate/pressure combination at any time in a water pipe, irrespective of the direction of circulation of the water in this duct, for the general purpose of producing electric energy rather than consuming it.

The device 1 may advantageously constitute a flow rate-pressure adapter in a pipe of a hydraulic network and a hydroelectric converter such that:

when there is too much flow rate and pressure in the outside pipe 3, the device 1 reduces them by converting the hydraulic driving force into electric energy, the hydraulic machine 6 acting as a turbine driving the electric machine 4, or by contrast, from the electric driving force coming from the outside, the device 1 transforms it into hydraulic energy by increasing the flow rate and the pressure, the hydraulic machine 6 acting as a pump, driven by the electric machine 4 acting as an electric motor.

If the device 1 is used in order to "break" exclusively the pressure and limit the flow rate, electricity production becomes very important. The idea promoted through this device primarily includes achieving complete regulation of the flow rate and of the pressure in a pipe, and then recovering the energy lost on that occasion.

The device 1 also makes it possible to raise the flow rate and the pressure. This then gives regulation in all directions, of the pressure and of the flow rate, which may be modified according to the circumstances, as a function of previously-studied assumptions of the characteristics of the outside water network.

The device 1 may advantageously be installed on any pipes 3 and more particularly on pipes with diameters that can range up to 700 mm and even beyond.

From a construction point of view, the device 1 may take the form of a uniform parallelepipedal assembly including properly arranged and protected hydromechanical and electronic parts mounted on individual supports held on a welded frame.

More particularly, in some embodiments, the hydraulic power unit 2 is advantageously situated at the bottom, while the electric machine 4 and the electronic portion are placed at the top. This arrangement gives it a good position. In the event of an incident on one or other of the portions, there is no interaction between the water and the electricity. As shown in FIG. 1, a general carrying frame may be firmly attached to a civil engineering structure which accommodates it.

The selective choice of a hydraulic machine 6 formed by a centrifugal pump that can be reversed as a turbine results from the following considerations. According to some embodiments, in order to limit the pressure and the flow rate, the centrifugal pump, in turbine mode, coupled to the electric machine 6 offers acceptable mechanical power characteristics that can be gathered from the shaft. By applying a hydrostatic pressure to the discharge of this type of pump, the latter becomes a turbine with an acceptable hydraulic efficiency that may if necessary be as much as 80%.

Divergence at the body and the rotor is fairly small, thereby making it efficient in both directions.

The hydraulic power unit 2 may be optimized by giving it a one-piece configuration with a majority of parts being cast or welded.

In an exemplary application, the choice will relate in particular, depending on the desired variations on pressure and flow rate, to a parting-line centrifugal pump, with a vertical axis, a rotor and two suction eyes on the volute. Such an adapted centrifugal pump allows very fine variations of pressure and flow rate due on the one hand to the simple but effective shapes of its rotor and of its volute and on the other hand to a possibility of variable rotation speed. This speed reduces relative to the maximum speed of the electric machine as a pump down to approximately a third of it, as a turbine in order to have an optimal efficiency of approximately two thirds.

In some embodiments, the hydraulic circuit 8 includes a set of hydromechanical parts placed such that they are always operational irrespective of the pressure and flow-rate values to be obtained and the direction of circulation of the water. Its architecture on the one hand matches all the possible outside combinations and, on the other hand, on the inside in the water inlet direction is imposed as a pump or as a turbine on intake and on discharge.

In some embodiments, the ducts of the hydraulic circuit 8 form a body with the body of the hydraulic machine, in order to limit, on the one hand, the number of parts and to obtain a compact hydraulic power unit and on the other hand in order to have more fluid circuits with better efficiencies.

As shown in FIGS. 1 to 8, according to some embodiments, the hydraulic circuit 8 is made in a symmetrical manner relative to the center of the rotating portion of the hydraulic machine 6.

An alignment of ducts is constituted by, on either side of the space in which the rotor of the hydraulic machine rotates, the identical portions 11a and 12a of the branching ducts 11 and 12, by the identical opposite end ducts 9 and 10.

The portions 11b and 12b of the branching ducts 11 and 12 are identical and symmetrical relative to the center of the rotating portion of the hydraulic machine 6. They have identical portions 11c and 12c perpendicular to the portions 11a and 12a, identical portions 11d and 12d parallel to said alignment of the ducts and identical portions 11e and 12e that are inclined forming identical obtuse angles with portions 11d and 12d and identical acute angles with the portions 12a and 11a.

In some embodiments, the electric machine 4 includes an asynchronous motor that can be reversed as an asynchronous, single-phase or three-phase generator.

In an embodiment, the electric machine 4 includes a stator (the fixed portion, housing) including windings supplied by an alternating power source, and a rotor (the rotating portion) including either a set of windings that are not supplied, or more normally short-circuit conductive bars called "squirrel cages".

When the stator windings are powered with alternating current, they create a rotating magnetic field. The stator supplies the rotor by induction. The rotor is the seat of induced currents which make it rotate at a speed almost equal to that of this magnetic field. This machine becomes a generator when the rotor rotates faster than the stator magnetic field. In motor mode, the rotor rotates slightly more slowly than the speed of synchronism. The advantage of such a machine is that it does not need to have an electrically supplied rotor. This simplifies its design. There are no collectors, so no maintenance at this level. It is the number of pairs of poles of the stator which determines this speed (n) in revolutions per minute.

Figure 10:
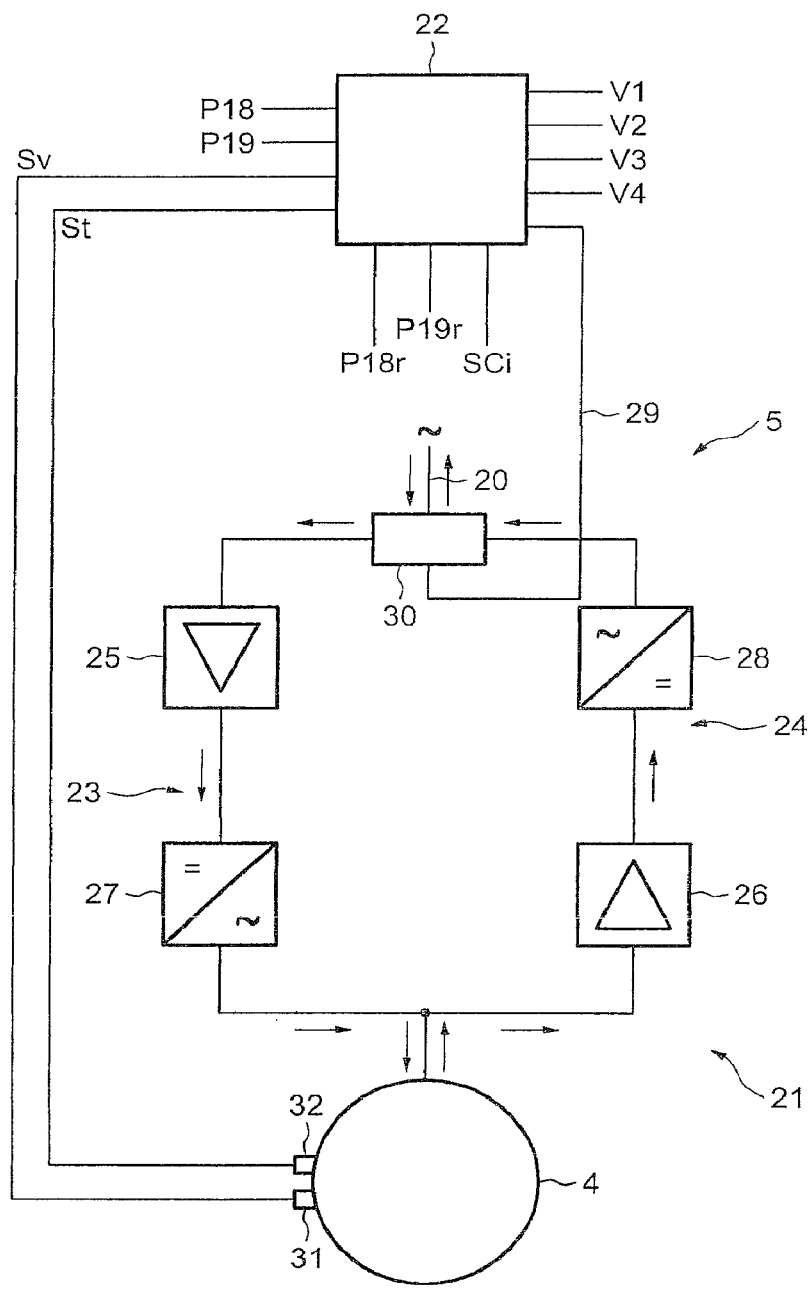
FIG. 10 illustrates a diagram embodying an electronic system of the device.

With reference to FIG. 10, the electronic system 5 will now be described.

According to the illustrated embodiment, the electronic system 5 manages the electrical interchanges between an alternating outside main electricity supply 20 and the electric machine 4 and selectively controls the motorized valves V1, V2, V3 and V4, in order to ensure an adoption of a direction of circulation and an adaptation of pressure and of flow rate in the outside pipe 3 to the hydraulic necessities of the hydraulic network.

Electronic system 5 includes an electronic variator 21 and a programmable controller 22.

The electronic variator 21 includes two parallel lines 23 and 24 which connect the electric machine 4 and the outside main electricity supply 20 by means of an electronic switching circuit 30 and which respectively include rectifiers 25 and 26 and inverters 27 and 28 which are mounted head-to-toe, so as to form a structure known as a four-quadrant structure. In addition, the programmable controller 22 is connected to a control input of the switch 30 via a line 29 in order to connect the electric machine 4 and the outside main electricity supply 20 either via the line 23 or via the line 24.

The programmable controller 22 is subject to outside signals which include a Sci signal representative of a desired direction of circulation in the outside pipe 3, either the direction SC1 or the direction SC2, and set point signals P18r and P19r which are representative of the desired pressure on the pressure sensors 18 and 19.

The programmable controller 22 receives the pressure signals P18 and P19 originating from the sensors 18 and 19, and a signal Sv originating from a sensor of the rotation speed of the shaft 7 connecting the electric machine 4 and the hydraulic machine 6 and a signal St originating from a torque sensor on this shaft.

The programmable controller 22 is programmed to deliver signals for controlling the motorized valves V1, V2, V3 and V4 and the electronic switching circuit 30, in order to selectively establish the operations described above so that the desired direction of circulation is established and the pressures P18 and P19 tend toward the desired set point pressures P18r and P19r, one, the other or both depending on the situations.

In the embodied case of operation of the hydraulic machine 6 as a pump in FIG. 5, corresponding to the direction S1 in the connecting duct 13 and in the direction SC1 in the outside duct 3, the programmable controller 22 is programmed to operate the electric machine 4 as an electric motor, by means of the electric variator 21, so that the downstream pressure P19 measured by the pressure sensor 19 reaches and is maintained at the set point pressure P19r.

In the embodied case of operation of the hydraulic machine 6 as a pump in FIG. 7, corresponding to the direction S1 in the connecting duct 13 and in the direction SC2 in the outside duct 3, the programmable controller 22 is programmed to operate the electric machine 4 as an electric motor, by means of the electric variator 21, so that the downstream pressure P18 measured by the pressure sensor 18 reaches and is maintained at the set point pressure P18r.

In the embodied case of operation of the hydraulic machine 6 as a turbine in FIG. 6, corresponding to the direction S2 in the connecting duct 13 and in the direction SC2 in the outside duct 3, the programmable controller 22 is programmed to operate the electric machine 4 as an electric generator, by means of the electric variator 21, so that the downstream pressure P18 measured by the pressure sensor 18 reaches and is maintained at the set point pressure P18r, by controlling the aperture of the valve V3 and taking account of the measured upstream pressure P19.

In the embodied case of operation of the hydraulic machine 6 as a turbine in FIG. 8, corresponding to the direction S2 in the connecting duct 13 and to the direction SC1 in the outside duct 3, the programmable controller 22 is programmed to operate the electric machine 4 as an electric generator, by means of the electric variator 21, so that the downstream pressure P19 measured by the pressure sensor 19 reaches and is maintained at the set point pressure P19r, by controlling the aperture of the valve V2 and taking account of the measured upstream pressure P18.

In general, when it is necessary to switch from one operating state to a new operating state, the programmable controller 22 is programmed to, in an initial transition time, place or regulate the valves in their respective bypass condition (FIG. 3 or 4) and, in a second time, after a certain stabilization period, place or regulate, preferably progressively, the valves in their conditions corresponding to this new operating state.

According to an embodiment, the pressure and flow-rate regulation and the variation of speed take place with the direction of rotation of the hydraulic machine. The energy is transmitted by means of the shaft connected to the electric machine. To control and regulate the energy consumed or produced by the hydroelectric power unit, use is preferably made of the two physical magnitudes of the state of the shaft 7, namely its torque and its rotation speed. The direction of rotation which gives the pump or turbine state, the intensity of the rotation speed and of the torque, define four characteristic zones of operation called "quadrants". Two correspond to two fundamental operations, as a pump (motor) or as a turbine (generator). The other two correspond to transitional phases of acceleration or of deceleration of the hydroelectric power unit in pumping operation or in turbine operation.

Depending on whether the device 1 is in pumping or turbine operation, there occurs a conversion of the electric driving force coming from the outside main electricity supply 20 into mechanical energy or a conversion of the hydraulic driving force to the outside main electricity supply 20 delivered as electric energy.

When operating as a pump, the device 1 is a consumer of electric energy which it takes from the outside main electricity supply 20. In an embodiment, due to the electronic variator 21, there are no operating jolts at the time of sudden startups and shutdowns.

In some embodiments, the programmable controller 22 delivers instructions to the electronic variator 21 which acts on the rotation speed of the electric motor 4, hence of the pump 6, in order to obtain the correct flow rate and the correct pressure in the outside duct 3. The electronic variator 21 makes it possible not only to vary the speed of the motor, but also to make it start up or shut down gently. It greatly reduces, with progressive acceleration or deceleration gradients, the overvoltages on startup and hammering, and electricity consumption.

In some embodiments, the variable speed of the asynchronous motor is achieved by supplying the windings of the stator with a voltage and an alternating current at variable frequency. With the aid of an alternating source at a fixed frequency, for example 50 hertz from the main electricity supply 20, a new source of variable frequency from a few hertz to 60 hertz is produced. The operating principle includes rectifying the alternating voltage of the main electricity supply 20 then, with the direct current obtained, supplying an inverter which delivers the voltage at a variable frequency to the motor, thereby providing it with a variable speed. The electronic variator 21 for asynchronous motors, called a "frequency converter", converts the voltages from the main electricity supply 20, for example from 380 v to 600 v or more between phases), into a voltage system, with variable frequency and amplitude. The frequency then determines the speed of the motor, the voltage acting on the torque.

Conversely, in some embodiments, when it is desired to "slow the water" in an outside pipe 3, in order to reduce the flow rate and the pressure, the hydraulic driving force is converted into electric energy and sent over the main electricity supply 20. The asynchronous electric machine 4 becomes an alternating asynchronous generator. The device 1 then operates as a turbine.

In an embodiment, while the device is in turbine operation, the electronic variator 21 is capable of generating stable current and voltage sent over the alternating main electricity supply 20.

In an embodiment, the nature of the squirrel cage asynchronous machine, which has no wound rotor, makes it necessary to draw from the main electricity supply 20 the voltage needed for its magnetization.

In some embodiments, since the rotation speed of the generator is variable, the voltage at its terminals with respect to the main electricity supply 20 is advantageously treated, otherwise its variable frequency makes it incompatible with electricity production. In this way the rectifiers and the inverters of the lines 23 and 24 are positioned head-to-toe. The process is reversed. The alternating voltage pulsed by the main electricity supply 20, delivered by the electric machine, that has become a generator, is rectified by the rectifier 26 then it passes into the inverter 28 which in return provides an alternating electricity production, for example at a frequency of 50 Hz, on the main electricity supply 20.

In the embodiment shown in FIG. 10, it may be noted that the line 23 is intended for operation as a motor and the line 24 is intended for operation as a generator, with an optimized internal switching logic based on the general control values passing through the programmable controller and the line 29.

Having previously established the hydraulic pressure curves according to the flow rates in the two portions 14 and 15 of the outside pipe 3, on either side of the device 1, and having stored these curves in the programmable controller 22, measuring the pressures via the pressure sensors 18 and 19 is sufficient to make the device 1 operate according to the stored program.

The valves may also have indicators confirming their setting. The programmable controller 22 may be adapted to carry out controlled accelerations or decelerations. The electronic variator 21 makes it possible to maintain at all times an optimized efficiency resulting from the quadrant assembly which makes the unit powerful and reversible.

According to an alternative embodiment, it would be possible to provide several connecting ducts 13 in parallel on which would be respectively installed hydraulic machines connected to several electric machines. According to another alternative embodiment, it would be possible to provide on the connecting duct 13 several hydraulic machines in series connected to several electric machines or to an electric machine via a transmission.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A reversible hydroelectric device that can be installed on an outside pipe, comprising:
    a hydraulic power unit comprising a hydraulic machine comprising a centrifugal pump that can be reversed as a turbine and a hydraulic circuit having branching and/or connecting ducts and motorized valves allowing water circulation in said hydraulic machine in one direction or the other irrespective of the direction of circulation of the water in said outside pipe;
    an electric machine coupled to said hydraulic machine and comprising an asynchronous motor that can be reversed as an asynchronous generator;
    and an electronic system comprising a programmable controller for adjusting and/or regulating said valves and an electronic variator for adjusting and/or regulating the rotation speed of said electric machine so that the pressure and/or the flow rate downstream of the hydraulic machine according to the direction of circulation is/are stabilized or adjusted to at least one set point value.

2. The device as claimed in claim 1, wherein said hydraulic circuit is symmetrical relative to the hydraulic machine.

3. The device as claimed in claim 1, wherein the body of said hydraulic machine comprises symmetrical ducts.

4. The device as claimed in claim 1, wherein the electronic system comprises a four-quadrant electronic variator mounted between a main electricity supply and said electric machine and providing, in operation as an asynchronous motor, the adjustment and/or regulation of the rotation speed of said electric machine and, in operation as an asynchronous generator, an electrical adaptation to the main electricity supply.

5. The device as claimed in claim 4, wherein the electronic variator comprises two lines in parallel comprising respectively a rectifier and an inverter, mounted head-to-toe, and a switch designed to connect the electric machine and the main electricity supply by either one of said lines or by the other.

6. The device as claimed in claim 1, wherein the electronic system comprises pressure and/or flow-rate sensors placed on either side of the hydraulic machine and connected to said programmable controller.

7. The device as claimed in claim 1, wherein the electronic system comprises sensors sensing the direction and/or rotation speed and/or torque of the hydraulic machine connected to said programmable controller.

8. The device as claimed in claim 1, wherein the electronic system comprises sensors sensing the voltage and/or current and/or frequency and/or thermal properties of the electric machine.

9. The device as claimed in claim 1, wherein the hydraulic circuit comprises two parallel branching ducts inserted between two portions of said outside pipe and at least one connecting duct the ends of which are connected to said branching ducts, that said hydraulic machine is installed on this connecting duct and that it comprises four motorized valves installed respectively on the portions of said branching ducts formed on either side of the ends of said connecting duct.

10. The device as claimed in claim 9, further comprising several parallel connecting ducts on which are respectively installed hydraulic machines connected to several electric machines or, on the connecting duct, several hydraulic machines in series connected to several electric machines or to an electric machine via a transmission.

* * * * *